United States Patent Office 3,047,616
Patented July 31, 1962

3,047,616
LIQUID PHASE OXIDATION OF ALKYL NAPHTHALENES TO ALDEHYDES AND ESTERS
Edgar A. Blair, Drexel Hill., John J. Melchiore, Wallingford, and Ivor W. Mills, Glenolden, Pa., assignors to Sun Oil Company, Philadelphia, Pa., a corporation of New Jersey
No Drawing. Filed Sept. 28, 1959, Ser. No. 842,610
17 Claims. (Cl. 260—488)

Liquid phase partial oxidation of alkyl aromatic compounds by means of oxygen-containing gas in the presence of a heavy metal oxidation catalyst is an increasingly important technique in the production of aromatic carboxylic acids. It provides known advantages with respect to convenience, oxidation rate and product purity as compared with various other known techniques. However, its use in the conversion of alkyl substituents on aromatic rings to other functional groups, has been mainly limited to the preparation of aromatic carboxylic acids. Aromatic aldehydes and aromatic-substituted alkanols have largely been prepared by other procedures which lack the advantages of the liquid phase oxidation with oxygen.

It has now been found that alkyl naphthalenes possess unique characteristics which permit them to be partially oxidized in liquid phase with oxygen to convert alkyl groups to oxygen-containing functional groups other than carboxyl groups and obtain non-acidic oxidation products in good yield.

Prior to the present invention, naphthaldehydes had apparently not been obtained in liquid phase partial oxidation of alkyl naphthalenes by means of oxygen-containing gas, and the reasons for this apparently were that it was not recognized that intermediate reaction products such as aldehydes could persist long enough in such oxidation to be recoverable as product, and the conditions that provide such persistence of intermediates had not been discovered.

It has now been found, however, that good yields of naphthaldehydes can be obtained by operation wherein a heavy metal oxidation catalyst is employed in amount of at least 10 weight percent calculated as cobaltous acetate tetrahydrate based on alkyl aromatic hydrocarbon charge stock, and wherein other conditions are suitably controlled. Contrary to the usual concept of catalytic function, it is necessary according to the invention, where naphthaldehydes are desired, to provide considerably greater amounts of catalyst than those which are normally considered sufficient to provide catalytic action.

It has further been found that good yields of methylol, i.e. hydroxymethyl, naphthalene derivatives can be obtained by operation wherein various oxidation conditions are controlled as subsequently set forth. Thus, for example, it is possible to produce $C_{10}H_7CH_2OOCCH_3$, the acetic acid ester of methylol naphthalene, by the oxidation of methyl naphthalene in the presence of acetic acid.

Naphthaldehydes are obtained as products in the process according to the invention by employing combinations of oxygen rate, temperature, and catalyst concentration which favor the formation of naphthaldehydes over the formation of naphtholic acids on the one hand and over the formation of methylol naphthalene derivatives on the other hand.

In a preferred embodiment, acetic acid is employed as solvent in the oxidation, since this solvent favors the formation of aldehyde over the formation of carboxylic acid, as compared with propionic acid as solvent.

Control over the formation of aldehyde can also be improved by regulation of the extent of agitation of the oxidation mixture. Vigorous agitation favors aldehyde over methylol derivatives, and favors carboxylic acid over aldehyde, so that intermediate agitation favors aldehyde over the other products. The extent of agitation depends not only on speed of rotation of a stirring member, if any, but also on the construction of the stirring member, and on the manner of oxygen introduction and distribution, and other factors, so that it is impossible to specify ranges of conditions for the agitation. However, in the light of the present specification, a person skilled in the art can select suitable agitation conditions for a given system.

Oxygen rates which favor the formation of naphthaldehydes include those within the approximate range from 0.1 to 2.5, preferably 1 to 2, liters of oxygen per minute per 100 grams of alkyl aromatic charge stock. Oxygen rates as given herein are expressed in liters at one atmosphere and 80° F., except where otherwise stated, and refer either to the total gas rate where pure oxygen is used or to the oxygen volume fraction of the total gas rate where the gas contains other components.

Temperatures which favor the formation of naphthaldehydes include those within the approximate range from 80° C. to 125° C., preferably 100 to 120° C.

Catalyst concentrations which favor the formation of naphaldehydes include those within the approximate range from 10 to 60 weight percent, preferably 20 to 50 weight percent, calculated as cobaltous acetate tetrahydrate based on alkyl aromatic compound.

Conditions which favor the formation of methylol naphthalene derivatives include oxygen rates in the approximate range from 0.05 to 1.5, preferably 0.05 to 0.75, liters per minute per 100 grams of alkyl aromatic compound, temperatures in the approximate range from 70° C. to 120° C., preferably 80 to 115° C., and catalyst concentrations in the range from 0.5 to 55 weight percent, preferably 5 to 45 weight percent, calculated as cobaltous acetate tetrahydrate based on alkyl aromatic compound.

No one variable is in itself determinative of the predominance of one product over another, since methylol naphthalene derivatives for example can be favored, even at relatively high oxidation temperatures that would normally favor aldehydes, by employing relatively low oxygen rates. By choosing proper combinations of conditions within the specified limits, the desired product can be made to predominate, even though one or two of the conditions taken alone would normally favor another product.

Preferably, the oxidation according to the invention is carried out in the presence of an alkanoic acid solvent for the alkyl aromatic charge stock. Preferably, the amount of solvent is in the approximate range from 7.5 to 15 parts by weight per part of alkyl aromatic compound, though other amounts can be used in some cases. The alkanoic acids which are known in the art as solvents for liquid phase partial oxidation of alkyl aromatic compounds, and the amounts thereof which are known for such oxidation, are generally suitable according to the invention.

The heavy metal oxidation catalysts which are known for use in the liquid phase partial oxidation of alkyl aromatic compounds are generally suitable for use according to the invention. Preferred catalysts are the cobalt salts of acetic or propionic acid, but other known catalysts can also be employed. In the oxidation of alkyl naphthalene hydrocarbon charge stocks, either cobaltous or cobaltic compounds can be employed, though usually the oxidation is more difficult to control when cobaltic compounds are used, the latter generally favoring the production of carboxylic acids rather than aldehydes or methylol derivatives. In the oxidation of alkyl naphthoic acids, on the other hand, cobaltic compounds are preferred, since the alkyl group in such compounds is less reactive than in alkyl naphthalene hydrocarbons, and the promoting effect of the cobaltic compounds may be needed for oxidation to occur even to the aldehyde or methylol derivative. Conversion of cobaltous acetate, for example, to a cobaltic compound takes place in acetic acid upon introduction of oxygen, though the conversion is inconveniently slow unless an activator, e.g. a bromine activator, is present.

If desired, an activator such as methyl ethyl ketone, ammonium bromide or other known activator for partial oxidation of alkyl aromatic compounds can be employed in the preparation of aldehydes or methylol derivatives according to the invention. However, in the oxidation of alkyl naphthalene hydrocarbons, it is usually not necessary to employ such activator, since good yields can be obtained without activator, and an activator if present may require closer control over oxidation conditions to avoid favoring carboxylic acid over the desired products. In the oxidation of alkyl naphthoic acids, on the other hand, e.g. 6-methyl-2-naphthoic acid, it is frequently desirable to employ an activator, in order to promote oxidation of the less reactive alkyl group, in such compounds to the aldehyde or methylol derivative. Where an activator is used, the amount is preferably in the range from 0.4 to 10 weight percent, calculated as ammonium bromide based on alkyl aromatic charge stock. Suitable bromine activators include those which are disclosed in Patent No. 2,833,816 issued May 6, 1958 to Alfred Saffer and Robert S. Barker.

Suitable charge stocks for use according to the invention include but are not limited to alpha-methyl naphthalene, beta-methyl naphthalene, 2,6-dimethyl naphthalene and its 1,4 and other isomers, 2,3,6-trimethyl naphthalene, alpha-ethyl naphthalene, beta-n-propyl naphthalene, 6-methyl-2-naphthoic acid, etc. In the case of the latter and similar charge stocks, products such as $HOOC_{10}H_6CHO$ and $HOOCC_{10}H_6CH_2OOCCH_3$ etc. are obtainable according to the process of the invention, employing the conditions with respect to oxygen rate, temperature and catalyst concentration that are disclosed herein for charge stocks generally, and employing the conditions with respect to nature of catalyst and use of activator that are disclosed herein for the alkyl naphthoic acid charge stocks.

Preferred charge stocks in the process of the invention are those having the formula:

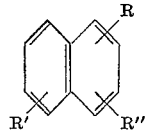

where R is an alkyl group having 1 to 6 carbon atoms, and where R' and R" are each selected from the group consisting of hydrogen, alkyl groups having 1 to 6 carbon atoms, and carboxyl groups. These charge stocks typically yield products having the same formula except that R is a —CHO group or a —CH$_2$OOC(CH$_2$)$_n$H group where $n$ is 1 or 2, and R' and R" are each hydrogen, an alkyl group having 1 to 6 carbon atoms, a carboxyl group, a —CHO group or a —CH$_2$OOC(CH$_2$)$_n$H group where $n$ is 1 or 2.

The alkanoic acid esters of methylol naphthalenes as produced according to one embodiment of the invention are useful as plasticizers for polyvinyl chloride and other vinylidene polymers, as plasticizers and extenders for natural and synthetic rubber, e.g. butadiene-styrene synthetic rubber, and in other applications. The esters can if desired be hydrolyzed or subjected to ester interchange by known technique, to obtain the free methylol naphthalene or other esters useful as plasticizers or in other applications.

The naphthaldehydes produced according to one embodiment of the invention are useful in the known applications of aromatic aldehydes, e.g. as additives for petroleum fractions, and also for conversion by known reactions of aromatic aldehydes to obtain other useful products.

The following examples illustrate the invention:

Example 1

The following materials are introduced into a one-liter Morton flask:

| | |
|---|---|
| 2,6-dimethyl naphthalene _____grams__ | 25 |
| Glacial acetic acid _____ml__ | 250 |
| Cobaltous acetate tetrahydrate _____grams__ | 12.5 |

Substantially pure oxygen is introduced into the liquid oxidation medium at a rate of 300 cc./min., measured at room temperature and slightly greater than atmospheric pressure while stirring the oxidation medium at 1300 r.p.m. by means of a glass stirring blade which just clears the bottom of the flask; the blade has approximately the shape of a two-inch diameter coin cut in half on a diameter and attached at the middle of the flat edge to the lower end of the stirring shaft. The oxidation medium is maintained meanwhile at the reflux temperature, which is about 114° C. After 6 hours, an aliquot is taken from the oxidation medium, and found to contain the following products in the indicated proportions, based on the sum of aromatic hydrocarbon charge stock and oxidation products, and determined by infrared and ultraviolet spectra:

| | Wt. percent |
|---|---|
| 6-methyl-2-naphthaldehyde _____ | 67 |
| 6-methyl-2-naphthoic acid _____ | 30 |
| 6-methyl-6-hydroxymethyl naphthalene, acetic acid ester _____ | 3 |

No unreacted dimethyl naphthalene is found in the oxidation medium. After 15 hours, the proportions of the three products are 60, 37 and 3% respectively, and after 24 hours, 49, 49 and 2% respectively.

This example shows that good yields of aldehyde are obtainable at the indicated conditions, and that relatively short oxidation times favor aldehyde over acid product.

Example 2

Example 1 is repeated, employing propionic acid in place of acetic acid, and conducting the oxidation at the reflux temperature, which decreases from about 130° C. to about 116° C. during the oxidation. The following table shows the composition of the charge-and-product portion of the oxidation mixture at the indicated times, as determined by vapor phase chromatography:

| | Weight Percent | | |
|---|---|---|---|
| | 6 hrs. | 15 hrs. | 24 hrs. |
| 6-methyl-2-naphthaldehyde _____ | 12 | 2 | 1 |
| 6-methyl-2-naphthoic acid _____ | 82 | 74 | 74 |
| 2,6-naphthalene dicarboxylic acid _____ | 0 | 20 | 20 |
| 2-methyl-6-hydroxymethyl naphthalene, propionic acid ester _____ | 2 | 3 | 3 |
| 2,6-dimethyl naphthalene _____ | 2 | 0 | 0 |
| Other _____ | 2 | 1 | 2 |

This example shows that the use of propionic acid at relatively high temperatures produces much inferior results in the preparation of aldehyde, as compared with the use of acetic acid at lower temperature, as in Example 1. This is partly attributable to the effect of the higher temperature in promoting the formation of carboxylic acid rather than aldehyde, and partly attributable to the effect of propionic acid, a considerable proportion of which is decomposed during the oxidation, in acting as an activator for the oxidation of aldehyde to carboxylic acid, an effect which is not obtained in comparable magnitude, if at all, with acetic acid.

Example 3

Example 1 is repeated, using an oxygen rate of 75 cc./min. instead of 300 cc./min. and a stirring rate of 650 r.p.m. instead of 1300 r.p.m. At 6 hours, the products include 65% of 6-methyl-2-naphthaldehyde, 19% of 6-methyl-2-naphthoic acid and over 11% of 6-methyl-2-hydroxymethyl naphthalene, acetic acid ester, as determined by infrared and ultraviolet spectra.

This example shows, by comparison with Example 1, that the yields of aldehyde are about the same at the lower oxygen rate and stirring rate as at the higher rates, and that the lower rates favor the hydroxymethyl ester over the carboxylic acid in the remaining minor portion of the oxidation product.

Example 4

Example 3 is repeated, using an oxygen rate of 25 cc./min. instead of 75 cc./min. At 6 hours, the products include 27% of aldehyde, 5% of carboxylic acid, 32 percent of hydroxymethyl ester, and 35% of unreacted dimethyl naphthalene. At about 27 hours, there is still 29% of unreacted dimethyl naphthalene.

This example shows that 25 cc./min. of oxygen per 25 grams of dimethyl naphthalene give reduced aldehyde yield and increased yield of methylol ester, under the otherwise prevailing conditions, as compared with 75 cc./min. in Example 3.

Example 5

The results with respect to production of aldehyde which are obtained with methyl naphthalenes are not obtained in the liquid phase partial oxidation of methyl benzenes. For example, when Example 1 is repeated using p-xylene in place of 2,6-dimethyl naphthalene, the product mixture contains 59% of toluic acid and 35% of terephthalic acid at 6 hours, and no nonacidic oxidation products are found. Tolualdehyde is apparently too unstable an intermediate to be recovered as a product in such oxidation.

The invention claimed is:

1. Method of producing aromatic aldehyde which comprises: contacting in liquid phase an aromatic compound having the formula

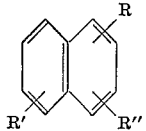

where R is an alkyl group having 1 to 6 carbon atoms per molecule and R' and R'' are each selected from the group consisting of hydrogen, alkyl group having 1 to 6 carbon atoms per molecule, and carboxyl; with oxygen at a rate of at least 0.1 liter per minute per 100 grams of said compound, in the presence of at least 10 weight percent of heavy metal oxidation catalyst calculated as cobaltous acetate tetrahydrate, and at a temperature in the range from 80° C. to 125° C.

2. Method according to claim 1 wherein said compound is 2,6-dimethylnaphthalene.

3. Method according to claim 1 wherein said compound is monomethylnaphthalene.

4. Method according to claim 1 wherein said oxygen rate is between 0.3 and 2.5 liters per minute per 100 grams of said compound.

5. Method according to claim 1 wherein said contacting is performed in the presence of an acetic acid solvent for compound.

6. Method of producing aromatic aldehyde which comprises: contacting in liquid phase an aromatic compound selected from the group consisting of 2,6-dimethylnaphthalene, monomethylnaphthalene, and 6-methyl-2-naphthoic acid; with oxygen at a rate between 1.0 and 2.0 liters per minute per 100 grams of said compound, in the presence of 20 to 50 weight percent cobaltous acetate tetrahydrate oxidation catalyst and 7.5 to 15 parts per part said compound of acetic acid solvent, at a temperature between 100° C. and 120° C.

7. Method of producing aromatic ester which comprises: contacting in liquid phase an aromatic compound having the formula

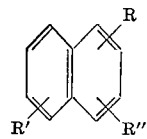

where R is an alkyl group having 1 to 6 carbon atoms per molecule and R' and R'' are each selected from the group consisting of hydrogen, alkyl group having 1 to 6 carbon atoms per molecule, and carboxyl; with oxygen at a rate between 0.05 and 1.5 liters per minute per 100 grams of said compound, in the presence of at least 0.5 weight percent of heavy metal oxidation catalyst calculated as cobaltous acetate tetrahydrate and an alkanoic acid solvent for said compound, at a temperature in the range from 80° C. to 120° C.

8. Method according to claim 7 wherein said compound is 2,6-dimethylnaphthalene.

9. Method according to claim 7 wherein said compound is monoethylnaphthalene.

10. Method according to claim 7 wherein said oxygen rate is between 0.05 and 0.30 liter per minute per 100 grams of said compound.

11. Method of producing aromatic ester which comprises: contacting in liquid phase an aromatic compound selected from the group consisting of 2,6-dimethylnaphthalene, monoethylnaphthalene, and 6-methyl-2-naphthoic acid; with oxygen at a rate between 0.05 and 0.75 liter per minute per 100 grams of said compound, in the presence of 5 to 45 weight percent cobaltous acetate tetrahydrate oxidation catalyst and 7.5 to 15 parts per part said compound of acetic acid solvent, at a temperature between 80° C. and 115° C.

12. Method of producing non-acidic aromatic products selected from the group consisting of naphthaldehydes and alkanoic acid esters of hydroxymethyl-substituted naphthalene hydrocarbons which comprises: contacting in liquid phase an aromatic compound having the formula

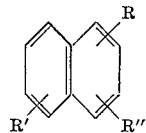

where R is an alkyl group having 1 to 6 carbon atoms per molecule and R' and R'' are each selected from the group consisting of hydrogen, alkyl group having 1 to 6 carbon atoms per molecule, and carboxyl; with oxygen at a rate of from 0.05 to 2.5 liters per minute per 100 grams of said compound, in the presence of from 0.5 to 60 weight percent of heavy metal oxidation catalyst calculated as cobaltous acetate tetrahydrate and 7.5 to 15 parts per part said compound of alkanoic acid solvent, at a temperature between 70° C. and 125° C.

13. Method according to claim 12 wherein said solvent is acetic acid.

14. Method according to claim 12 wherein said catalyst is cobaltous acetate tetrahydrate.

15. Method according to claim 12 wherein said compound is 2,6-dimethylnaphthalene.

16. Method of producing non-acidic aromatic products selected from the group consisting of naphthaldehydes and alkanoic acid esters of hydroxymethyl-substituted naphthalene hydrocarbons which comprises: contacting in liquid phase an aromatic compound selected from the group consisting of 2,6-dimethylnaphthalene, monomethylnaphthalene, and 6-methyl-2-naphthoic acid; with oxygen at a rate of from 0.05 to 2.5 liters per minute per 100 grams of said compound in the presence of from 0.5 to 60 weight percent of cobaltous acetate tetrahydrate and 7.5 to 15 parts per part said compound of acetic acid solvent, at a temperature between 70° C. and 125° C.

17. Method according to claim 16 wherein said compound is 2,6-dimethylnaphthalene.

References Cited in the file of this patent

UNITED STATES PATENTS

| | | |
|---|---|---|
| 2,199,585 | Bone et al. | May 7, 1940 |
| 2,503,291 | Odell | Apr. 11, 1950 |
| 2,892,868 | Lederle et al. | June 30, 1957 |